Oct. 1, 1935.  S. A. GAEDE  2,015,790
CONVERTIBLE BREAST AND BENCH DRILL
Filed Nov. 10, 1934
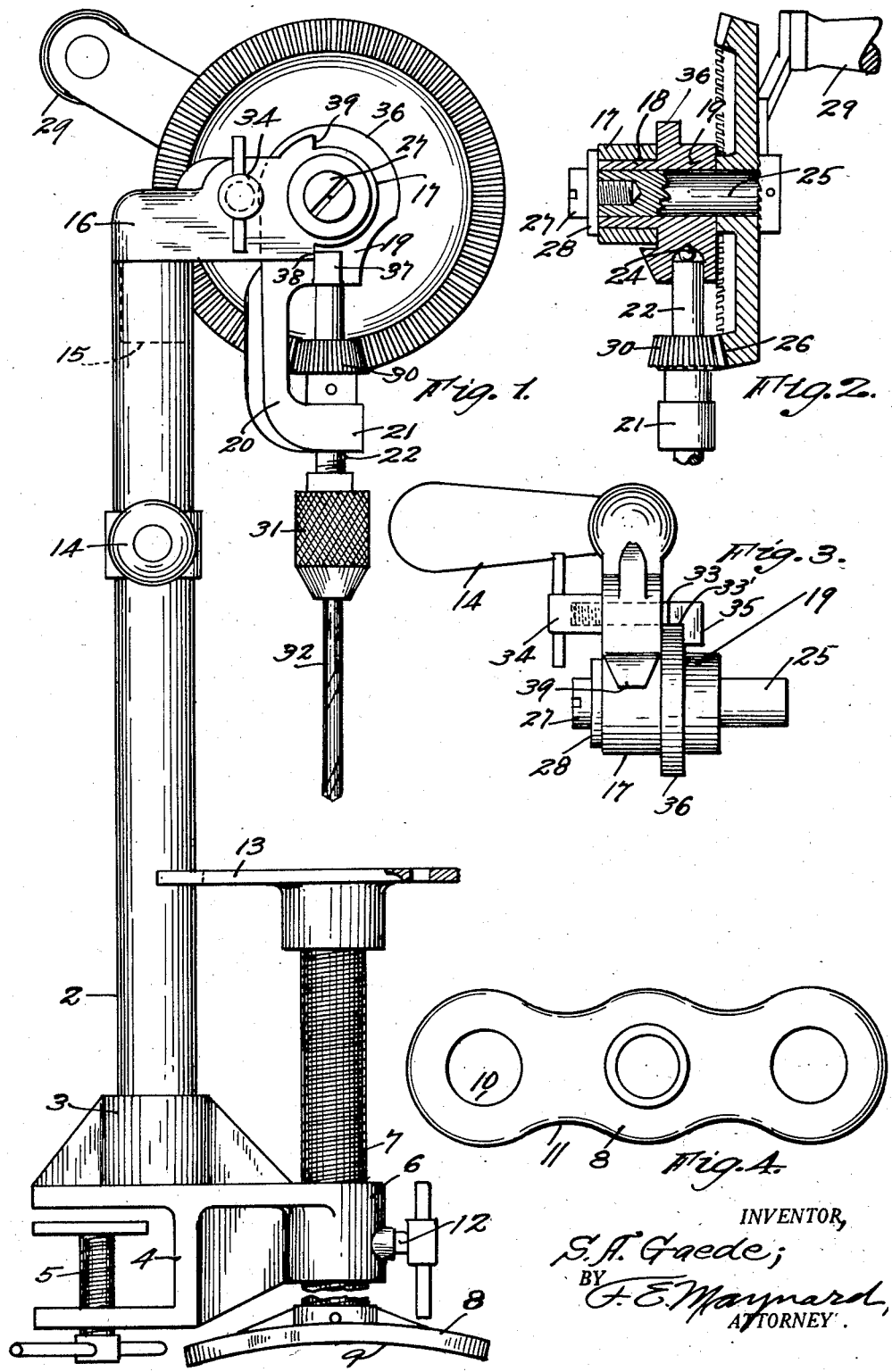
INVENTOR,
S. A. Gaede;
BY F. E. Maynard,
ATTORNEY.

Patented Oct. 1, 1935

2,015,790

UNITED STATES PATENT OFFICE 2,015,790

CONVERTIBLE BREAST AND BENCH DRILL

Samuel A. Gaede, Los Angeles, Calif.

Application November 10, 1934, Serial No. 752,487

1 Claim. (Cl. 77—19)

This invention is a convertible, hand drill, tool combination.

It is an object of the invention to provide a simple, practical, substantial and inexpensive hand drill tool having adaptability either as a readily set-up bench tool or usable manually as a breast drill for general work in which the tool device must be pressed by weight of the user to drive the drill into the work while the drill is at the same time rotated in the customary manner.

More specifically, an object is to provide a breast drill incorporating means whereby it may be securely attached to a bench or other suitable and substantial support, and further being provided with means enabling the drill driving shaft to be angularly adjusted as to its main support through a large arc, as, for instance, from a bench work position in which the applied drill will point straight down toward a work table to a directly opposite position for use of the device as a breast drill, with the drill pointing straight ahead and away from its main support while the latter is thrust against the chest of the operator.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a side elevation of the device set up as a bench drill; some parts being broken away.

Figure 2 is an axial section of the swivel head of the tool.

Figure 3 is a plan of the swivel head.

Figure 4 is a plan of the breast rest; this forming the feed handle when the tool is used on bench work.

In its preferred form the tool includes a stiff column here depicted as a piece of pipe or tubing 2 of any desired material and size; its lower end being pressed firmly into a socket 3 forming a part of a horizontal yoke 4 applicable to a bench or shelf edge and fastened thereto by a clamp screw 5 in conventional manner.

Though it may be otherwise arranged a screw box 6 is here shown as forming a part of the clamp yoke 4 and threaded in the box is a stout screw 7 disposed parallel with the column tube 2 and having on its lower end a handle part 8 with a somewhat concaved outer face 9 to which the shoulder of the operator may be pressed in some uses of the tool, as later set forth herein. To facilitate spinning of the screw to change its position in the box the handle has finger holes 10 near its ends and also has its sides incurved at 11 for convenient finger rest or for purchase in applying screw turning effort. A suitable clamp screw 12 is provided in the box 6 to secure it at desired position.

On the upper end of the screw 7 there is attached a work table 13 having interlocking engagement with the tube 2 so as to be held against rotation with the screw and guiding itself along the tube as the screw 7 is turned to feed the table up or retract it.

At a suitable location on the tube there is fixed a handle 14 which projects perpendicular to the tube to facilitate use of the tool as a breast drill.

Into the top of the tube 2 there is solidly pressed a plug 15 forming a part of a head casting 16 which overhangs the work table 13 and is provided with a journal 17 whose axis is transverse to and is on a plane along the axis of the table 13. Turnable in the journal 17 is a sleeve 18 extending laterally from the upper hub 19 of a frame 20 having a lower boss 21 in which is journaled a short shaft 22. The upper end of the shaft 22 has an end thrust bearing 24 in the frame hub 19; the shaft 22 being radial to the hub and its swivel bearing sleeve in the head journal 17.

Turnably mounted in the frame hub 19 is a cross-shaft 25 having a drive gear 26 fixed on one end and a retaining screw 27 and washer 28 on the other end and turning on the near face of the head journal 17. The gear 26 is provided with a hand crank 29 whereby the cross-shaft 25 is driven through means of a pinion 30 fixed thereon and in constant mesh with the larger gear 26.

The head journal of the frame 20 enables the latter to be turned from the position shown in Fig. 1 through a large arc about the journal to a position diametrically opposite so that the shaft 22 points straight upward from the head journal. This shaft 22 is provided with a suitable chuck 31 in which may be inserted a drill 32 or other implement. In place of the chuck any other adaptable implement may be applied to the driven shaft 22, as may be found desirable.

For the purpose of securing the drill frame 20 at any desired position in angular adjustment about the head journal 17 this is provided with a clamp device here in the form of a pull screw 33 with a draw nut 34 on its front end and a lateral lug 35 on its rear end; this being engageable with an arcuate flange 36 provided on the frame hub 19 and operative to jam the hub against the journal 17 when the draw nut is turned to that effect. To prevent rotation of the screw 33 it may have a flat side facet 33' to abut interferingly on the periphery of the flange 36, though any other device for the same function may be employed.

To limit the angular adjustment of the frame at the extremes mutual stop means are provided, and here include a side lug 37 on the frame hub to engage spaced abutment shoulders 38—39 provided on the journal 17.

The dual utility of the tool, above set forth, is thought to be clear. When bench work is to be performed the column 2 is clamped by the yoke to a bench or other handy ledge for a support, the work is set or fastened, in desired manner, on the table 13, the implement desired is attached to the driven shaft 22, and the gear crank 29 is turned while the table is moved up by rotation of the feed screw 7; the shaft 22 being adjusted to the position of Fig. 1.

The tool becomes portable when detached from the bench and the shaft frame 20 may be set angularly at any point in its range for various uses. For common breast drill use the frame 20 is turned to a position directly opposite that of Fig. 1, and in which case the handle 8 placed against the user's shoulder or chest to place drive pressure on the drill applied to the chuck.

It is understood that the tool, at will, may be set up in horizontal position where work may most conveniently be performed in such an arrangement.

What is claimed is:

A portable, hand, bench drill tool provided with means for converting the tool into a breast drill; said tool including a column and an adjustable table, and a head piece fixed on the column overhanging the table and having a journal bore whose axis is transverse to and on the projected axis of the table; said means including a frame having a part at one end journaled in said bore and turnable thereabout, a gear shaft turnably mounted in said frame concentric to its journal axis and passing from side to side of the journalled end of the frame, means to stop end shift of the shaft, a gear fixed to the shaft, a chuck shaft extending radially from the axis of said gear shaft and having its inner end journalled in, and radial to the axis of, the journalled end of the frame and said frame having a bearing at its outer end for the chuck shaft, and a pinion fixed on said chuck shaft inwardly of the outer bearing and meshing with said gear, the chuck shaft terminating in its bearing, in the inner end of the frame, short of the said gear shaft.

SAMUEL A. GAEDE.